United States Patent
Blishak

[11] 3,750,139
[45] July 31, 1973

[54] TIME MATRIXING METHOD OF ENERGIZING SELECTIVE SEGMENTS OF MULTI-CELL LIQUID CRYSTAL DISPLAYS

[75] Inventor: Theodore L. Blishak, Menlo Park, Calif.

[73] Assignee: SCM Corporation, New York, N.Y.

[22] Filed: July 2, 1971

[21] Appl. No.: 159,392

[52] U.S. Cl....... 340/336, 315/169 R, 340/166 EL, 340/324 R, 350/160 LC
[51] Int. Cl. ............................................. G08b 5/36
[58] Field of Search.......... 340/324 R, 336, 166 EL; 350/160 R, 160 LC, 160 P, 267; 178/7.5 D; 315/169 R

[56] References Cited
UNITED STATES PATENTS

| | | | |
|---|---|---|---|
| 3,474,437 | 10/1969 | Wang | 340/324 R |
| 3,505,804 | 4/1970 | Hofstein | 340/324 R X |
| 3,555,544 | 1/1971 | Atkins | 340/336 X |
| 3,580,421 | 5/1971 | Bickford | 340/336 X |
| 3,594,758 | 7/1971 | Gluck | 340/324 R |
| 3,614,769 | 10/1971 | Coleman et al. | 340/343 X |
| 3,614,771 | 10/1971 | Band et al. | 340/324 R |
| 3,648,102 | 3/1972 | Bettin | 340/324 R X |
| 3,668,689 | 6/1972 | Drage | 340/336 |

Primary Examiner—David L. Trafton
Attorney—Armand G. Guibert

[57] ABSTRACT

A time matrixing method is disclosed for energizing a liquid crystal display having a plurality of liquid crystal display cells with each cell having a plurality of energizable character segments. The method comprises the step of sequentially pulsing the cells with 1st pulses of 1st pulse amplitude sufficient to energize the cells but of 1st pulse length insufficient to energize them. Between each of the sequential 1st pulses each of the cells is pulsed with a 2nd pulse of 2nd pulse waveform insufficient to energize the cells alone or in successive waveform combination with the 1st pulses. Upon command, selective segments are pulsed in time succession with selected 1st pulses applied thereto with 3rd pulses of 3rd pulse amplitude sufficient to energize the selected cell segments and of 3rd pulse length insufficient alone to energize the selected cell segments and insufficient to energize the selected cell segments in successive pulse length combination with the 2nd pulses but sufficient to energize the selected cell segments to a light scattering mode when the 3rd pulses are applied in successive pulse length combination with the selected 1st pulses. Thereafter, application of the 2nd pulses is effective to maintain the selected cell segments in their light scattering mode.

12 Claims, 7 Drawing Figures

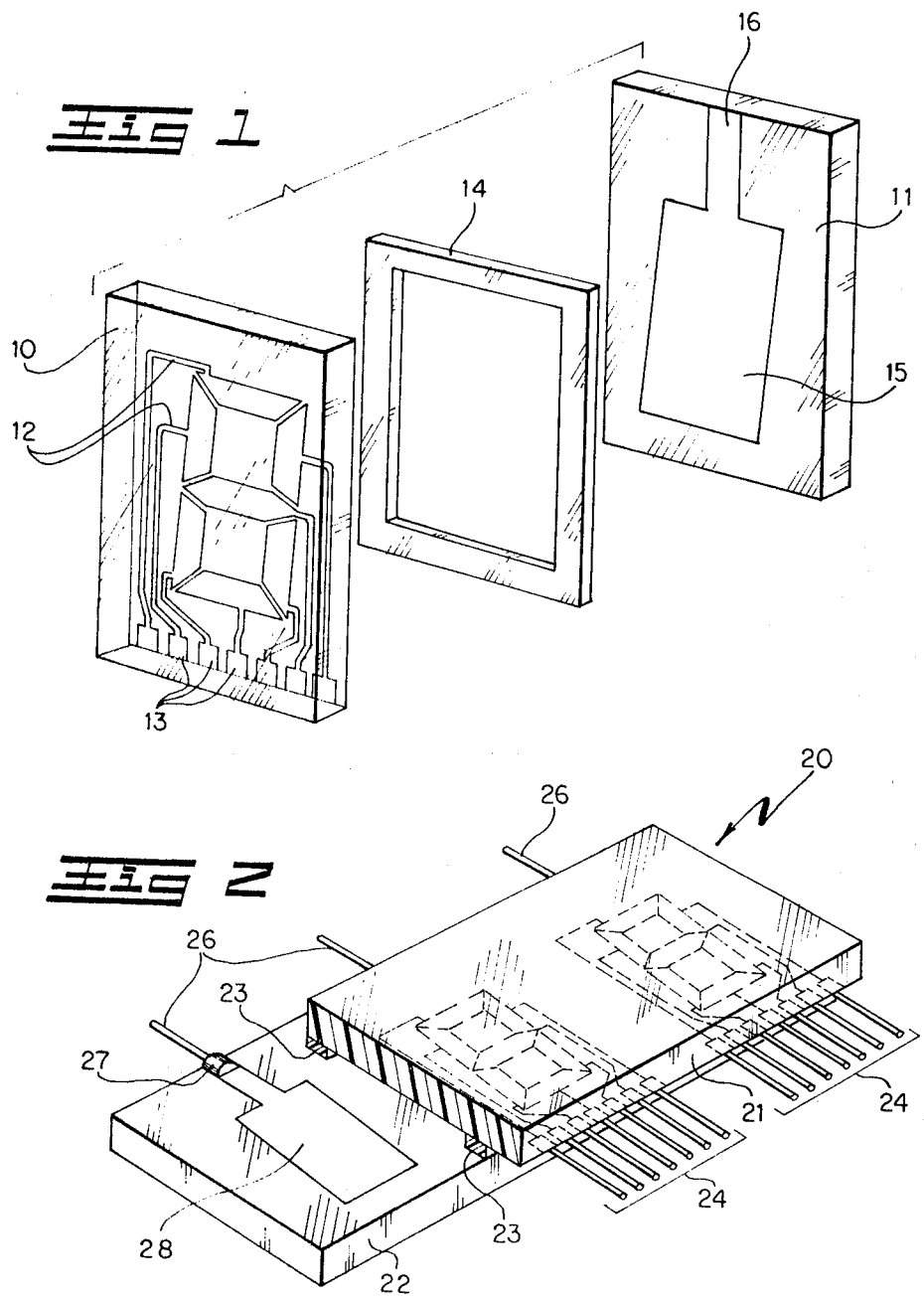

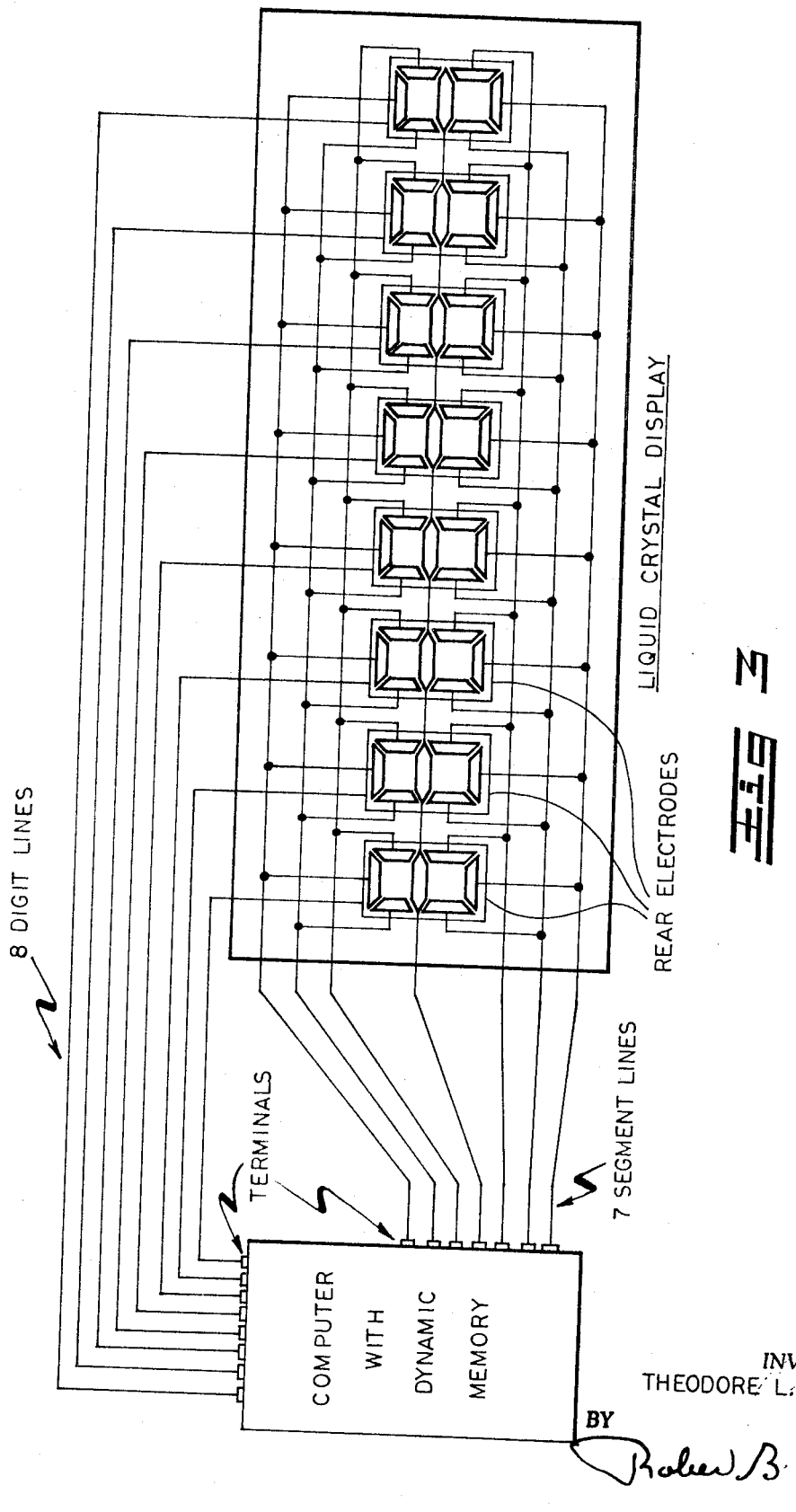

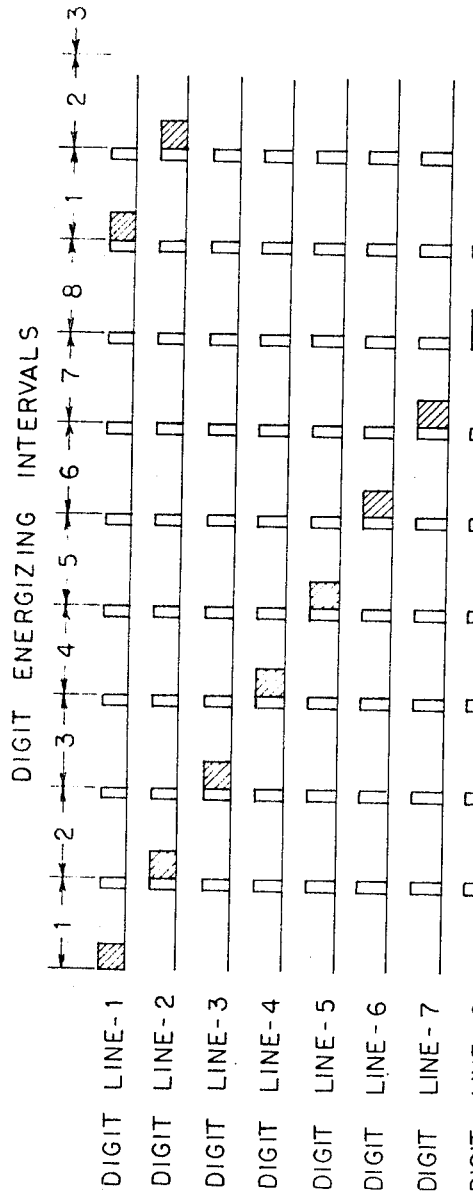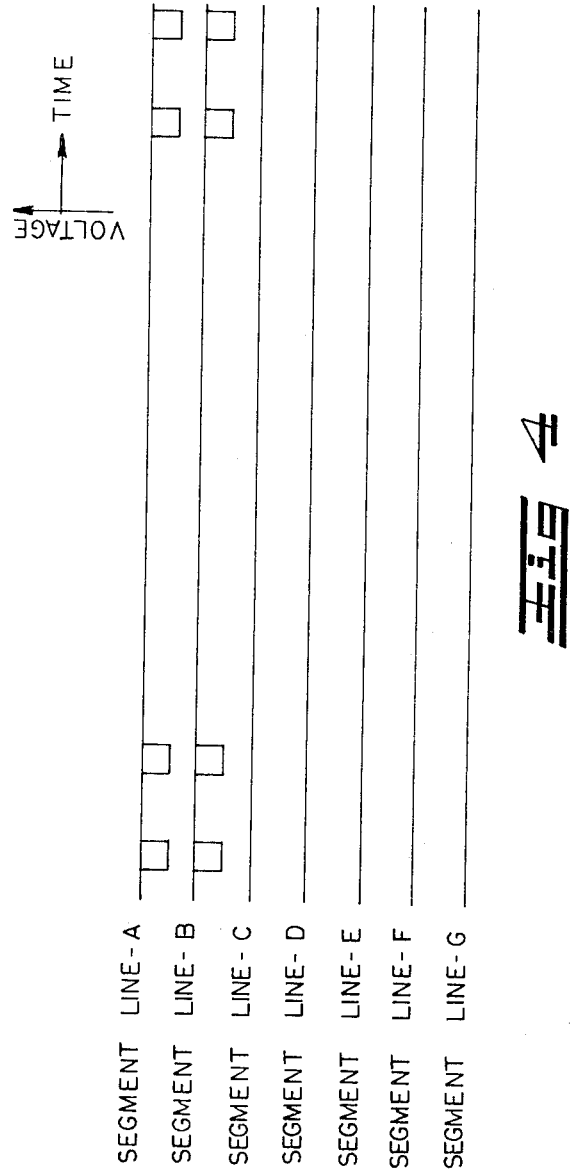

INVENTOR.
THEODORE L. BLISHAK
BY
Robert B. Kennedy 3,750,139

TIME MATRIXING METHOD OF ENERGIZING SELECTIVE SEGMENTS OF MULTI-CELL LIQUID CRYSTAL DISPLAYS

RELATED APPLICATION

This application discloses an improvement over the invention disclosed in U.S. Ser. No. 152,197, having the same inventor and title and filed June 11, 1971, now abandoned.

BACKGROUND OF THE INVENTION

This invention relates generally to liquid crystal displays, and particularly to methods of energizing selected segments of multi-cell liquid crystal displays.

When thin layers of certain organic nematic liquid crystal compositions in their mesomorphic state are placed within the bounds of an electric field above a threshold value, the degree of light scattering exhibited by the layer is seen to increase substantially. This phenomonon was utilized in an early light valve taught in 1936 by British Pat. No. 441,274.

More recently, it was observed that when only selected portions of such a layer of liquid crystal is placed in an electric field the increase in scattering is sharply confined to those portions laying within the field. The contrast in scattering between those portions within and those portions without the field is quite pronounced. This observation rendered liquid crystals particularly suitable for use in visual display devices. In 1967 U.S. Pat. No. 3,322,485 disclosed such a device comprising two substrates having adjacent parallel surfaces less than ½ mm. apart confining an organic nematic mesomorphic compound therebetween. Selected portions of the spaced, opposing surfaces are coated with a transparent, electrically conductive material in shapes representative of visual information such as alphanumeric characters. Each coating is connected to a source of electric energy. When the voltage thus applied reaches a threshold value, which value is determined by the composition and thickness of the particular organic nematic compound used, a change in the optical properties of the compound is observed in those regions located in the induced electric fields between the two conductive coatings. Those regions located without the bounds of the field remain transparent. The device may operate either in a transmitting mode with a light source positioned on the opposite side of the display from the observer, or in a reflecting mode with the light source and observer both located on one side. In the transmitting mode both substrates are transparent whereas in the reflecting mode only one substrate need be transparent.

Liquid crystal displays of the type just described may be used as optical readouts of information from computers and calculators. In such rolls the devices must usually have the capacity of displaying multi-unit characters or digits. This may be done by juxtapositioning several liquid crystal cells each of which may display an individual character or digit by selectively energizing selective alphanumeric character segments. This could, of course, be accomplished by feeding pulse trains from a computer or calculator having a dynamic memory to a static memory. The dynamic memory enables data to be continuously changed whereas the static memory captures data intermittently transmitted to it and stores such till countercommanded. From the static memory individually extends an electrical conductor to each character segment in each liquid crystal cell. Thus, in a display comprising eight characters or digits of seven segments each, there are required 56 mutually insulated, electrically communicative paths. Such a network is, of course, quite complex and expensive.

In abandoned patent application Ser. No. 152,197, filed on June 11, 1971 by Theodore L. Blishak and titled "Time Matrixing Method of Energizing Selective Segments of Multi-Cell Liquid Crystal Displays," which application is assigned to the same assignee as the present application, a method is taught, as the title indicates, for energizing selective segments of multi-cell liquid crystal display readouts from calculators, computers and the like, and for doing so without use or need for a static memory. This is accomplished by sequentially pulsing the cells with 1st pulses of 1st pulse amplitude sufficient to energize the cells but of 1st pulse length insufficient to energize the cells. Selected segments are pulsed in time sequence with the 1st pulses applied to selected cells with 2nd pulses of 2nd pulses amplitude sufficient to energize the cell segments and 2nd pulse length alone insufficient to energize the cell segments but sufficient to energize the cell segments when the 2nd pulse length is consecutively added to the applied 1st pulse length. Use of this method negates need for separate, electronically communicative paths between the pulse emitter and each individual segment in each of the cells.

Though the just-described method is quite suitable for use with displays of relatively few cells, a problem does arise when it is used with displays comprising a relatively large number of cells. This is due to the fact that the time interval between successive "1st pulses" as applied to any specific cell increases proportionally with the number of cells present inasmuch as these pulses are sequentially applied to each cell in the array. Once the electric field through a cell is terminated the degree of exhibited light scattering begins to decrease. Given sufficient time this decay becomes complete, that is the liquid crystal returns to its non-light scattering condition. As the time span increases between successive pulses applied to an individual cell the cell will appear to pulsate, then flicker, and finally, of course, graduate to a set of distinct "on" and "off" periods.

Accordingly, it is a principal object of the present invention to provide improved time matrixing methods of energizing selective segments of multi-cell liquid crystal displays.

More specifically, it is an object of the present invention to provide a time matrixing method of energizing selective segments of multi-cell liquid crystal displays which method results in relatively constant light scattering being exhibited over a substantial period of time even though the selective segments are only intermittently pulsed during this period.

SUMMARY OF THE INVENTION

Briefly described, the present invention is an improved time matrixing method for energizing a liquid crystal display having a plurality of liquid crystal display cells with each cell having a plurality of energizable character segments. By use of the method the segments are selectively energized in forming visable character displays. The method comprises the steps of sequentially pulsing the cells with 1st pulses of 1st pulse amplitude sufficient to energize the cells but of 1st pulse length insufficient to energize the cells. Between each of the sequential 1st pulses each cell is pulsed with a 2nd pulse of 2nd pulse waveform insufficient to energize the cells alone or in successive waveform combination with the 1st pulses. Upon command selective segments are pulsed in time succession with selected 1st pulses applied to selected cells with 3rd pulses of 3rd pulse amplitude sufficient to energize the selected cell segments and of 3rd pulse length insufficient alone to energize the selected cell segments and insufficient to energize the selected cell segments in successive pulse length combination with the 2nd pulses but sufficient to energize the selected cell segments to a light scattering mode when the 3rd pulses are applied in successive pulse length combination with the selected 1st pulses. Thereafter, application of the 2nd pulses is effective to maintain the selected cell segments in their light scattering mode.

BRIEF DESCRIPTION OF THE DRAWING

FIG. 1 is an exploded view of a liquid crystal cell which may be used in practicing the present invention.

FIG. 2 is a perspective view of a multi-cell liquid crystal display panel with a portion of one panel member removed.

FIG. 3 is a schematic diagram of an energizing circuit which may be used in practicing the present invention with an eight cell liquid crystal display panel.

FIG. 4 schematically illustrates pulse trains which may be transmitted over the circuit shown in FIG. 3 in practicing the invention.

DESCRIPTION OF THE PREFERRED EMBODIMENTS

Figure 5:
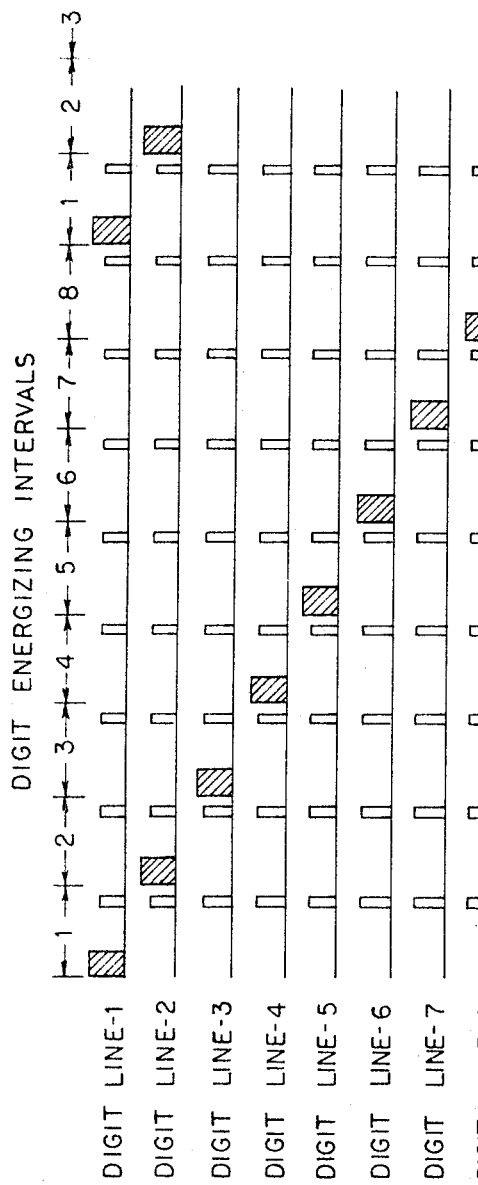
FIG. 5 schematically illustrates another set of pulse trains which may be transmitted over the circuit shown in FIG. 3 in practicing the invention.

Referring now in more detail to the drawing there is shown in FIG. 1 an exploded view of one cell of a liquid crystal display panel comprising two thin transparent plates 10 and 11 which plates may be made of such materials as ordinary plate glass, fused quartz and transparent plastics or resins. Two adjacent surfaces of the plates are selectively coated with a transparent, electrically conductive material comprising indium oxide or tin oxide such as Nesatron (TM) or Nesa. The conductive coating on plate 10 is seen to be patterned in the form of a blocked figure eight character consisting of seven spaced character segments. A portion of this coating extends from each segment to form an electric lead 12 which lead connects each segment with an associated segment terminal 13. The conductive coating on plate 11 is seen to be patterned in the form of a rectangle 15 having a periphery in juxtaposition with the periphery of the figure eight pattern on plate 10 once the two plates are assembled. An extension 16 of this coating from the periphery of rectangle 15 provides electrically connective means.

Sandwiched between the two opposing, coated surfaces of plates 10 and 11 is a hollow, dielectric spacer 14. During cell assembly the space bound by plates 10 and 11 and spacer 14 is filled with an organic nematic mesomorphic compound. Thus, spacer 14 also serves as a sealer once the cell is assembled. Examples of suitable organic nematic mesomorphic compounds include Deca-2, 4, dienoic acid, 4,4' di-n-heptoxyazoxybenzene, 4,4' dimethoxystilbene, and 4-p-methoxybenzylideneaminobiphenyl.

Once the cell is assembled and maintained in the temperature range in which the confined compound exhibits the nematic mesophase, that is in the temperature range above the nematic transition temperature of the compound but below the temperature at which the compound becomes isotropic, the cell may be operated by establishing one or more electric fields through the confined compound. For example, should one wish to display a figure eight connective means 16 and each of the seven segment terminals 13 would be coupled to a source of electric energy. Such energy source may be quite weak such as one capable of establishing some 20 volts between the figure eight coating segments and rectangle coating 15 with a one mil spacing therebetween. Once the threshold value is surpassed light impinging on the figure eight segments is seen to be scattered several orders of magnitude more than light passing through the plates adjacent the segments. Should one wish to display the figure zero instead, connective means 16 and each segment terminal 13 except that connected to the mid horizontal segment would be coupled to the electric energy source. In this manner each numerical digit may be displayed by the single cell. A number of cells may, of course, be assembled in side by side fashion to form multi-digit numbers.

FIG. 2 illustrates a liquid crystal display panel 20 comprising three assembled cells of the type just described. Upper transparent plate 21 is seen to overlay lower transparent plate 22 with spacer 23 sandwiched therebetween. It should be noted that plates 21 and 22 are slightly offset from one another. This disposition provides access to the conductive coatings on each plate so that external electrical conductors may be easily joined thereto as illustrated. Flexible cables 24 each include seven insulated conductors each of which is respectively connected to an individual segment terminal 25. Four insulated conductors 26 are likewise respectively joined to coating extensions 27 of rectangular coatings 28 on lower plate 22.

FIG. 3 schematically illustrates an energizing circuit which may be used in practicing the present invention. The liquid crystal display here is seen to comprise eight juxtaposed liquid crystal cells with each cell having seven mutually insulated alphanumeric character segments. Each cell has a rectangular electrode spaced from the segments with liquid crystal confined therebetween. The electrode preferably is located behind the character segments from the viewer to each of which segments an electrical conductor extends from a computer having dynamic memory capability. An electrical conductor also extends from the computer to each character segment of one cell. Corresponding character segments in the remaining cells are coupled in parallel to the one cell. The absence of a static memory should be noted as well as the fact that only 15 electrically conductive paths are provided between the computer and liquid crystal display, eight digit lines to the rectangular electrode for each cell and seven segment lines to each distinct character segment.

FIG. 4 schematically illustrates an electronic method for selectively energizing the segments in a multi-cell liquid crystal display such as that shown in FIG. 3 utilizing principles of the present invention. In FIG. 4 voltage amplitude is plotted versus time for each of the eight digit and seven segment lines. Here, the cross-hatched pulses sequentially transmitted over the digit lines are of sufficient amplitude but are of insufficient pulse length to energize the cells. Thus, these pulses, which herein are referred to as "1st pulses," do not alone energize the cells and the liquid crystal contained therein remains in its non-light scattering condition.

Figure 6:
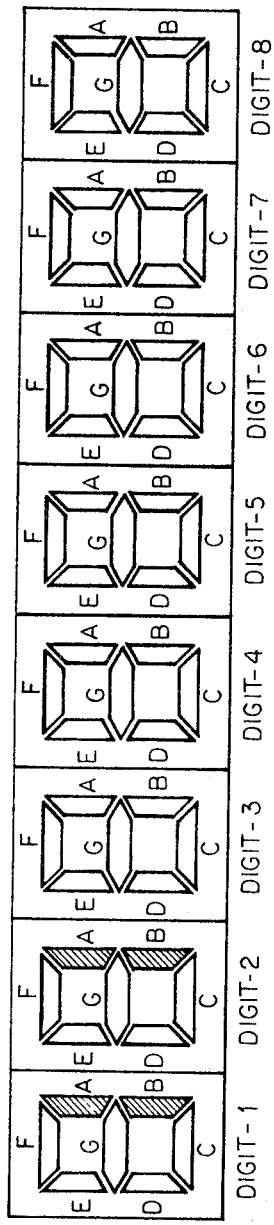
FIG. 6 schematically illustrates specific digits being displayed in response to the pulse trains shown in FIGS. 4 and 5.

Now suppose, for example, digits 1 and 2 were each commanded, such as by a computer output, to exhibit the numeral "1" as seen in FIG. 6. This would necessitate the energizing of segments A and B in each of these digits. Accordingly, turnon pulses, herein referred to as "3rd pulses," would be transmitted over segment lines A and B during digit energizing intervals 1 and 2 as shown in FIG. 4. These turnon pulses are also of sufficient amplitude to energize the cell segments but are of insufficient pulse length to energize them. However, it should be noted that during digit energizing interval 1 the turnon pulses to segments A and B immediately follow the termination of the 1st pulse transmitted to the entire digit over digit line 1. Thus, segments A and B of digit 1 during this interval are pulsed for the combined period of the pulses transmitted over the digit lines and the turnon pulses transmitted over the segment lines immediately thereafter. The combined pulse lengths are sufficient to energize the segments. Accordingly, the segments are energized. Digit 2 is next energized in the same manner. Digits 3 through 8 are sequentially pulsed but without the addition of turnon pulses thereto these cells remain unenergized. Following the pulse transmitted to digit 8 digit 1 is once again pulsed. In like manner segments A and B of this digit are energized due to the transmission of turnon pulses to these segments, as illustrated.

The polarity of the pulses transmitted over the digit lines is opposite to that transmitted over the segment lines to the cells. However, as these lines communicate to opposite cell electrodes the polarity of the voltage across the cell itself remains the same for both.

As previously stated neither the digit line pulses nor the segment line pulses are in themselves of sufficient pulse length to energize a cell segment. It is only the consecutive sum of their pulse lengths which causes a segment to be energized. Preferably, turnon segment pulses are transmitted immediately upon termination of a digit line pulse. However, their order could, of course, be reversed. In addition, portions of consecutive digit line and segment line pulses may overlap or be slightly spaced in time sequence. Such minor deviations in timing do not prevent energizing from occurring and thus are intended to be included within the meaning of the term "in time succession" as used herein in describing the time sequencing of pulses applied to a selected cell and to one or more selected segments of that cell in effecting turnon.

With continued reference to FIG. 4 it will be seen that a pulse of relatively short pulse length is simultaneously transmitted over each of the eight digit lines at the end of each digit energizing interval. These pulses are herein referred to as "2nd pulses." The function of these may best be understood now by reference to FIG. 7.

Figure 7:
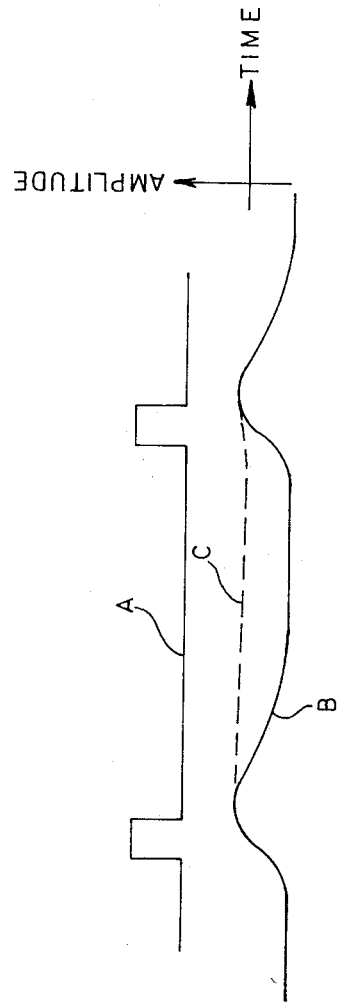
FIG. 7 plots light scattering response of liquid crystals in general to electronic pulser above light scattering threshold levels.

When a voltage is placed across a thin layer of liquid crystal above a certain threshold voltage level the liquid crystal will start to exhibit an increase in light scattering. The threshold is dependent upon many factors not all of which are yet fully understood. However, frequency or duty cycle of the electrical energy, the thickness of the liquid crystal layer, and the composition of the liquid crystal itself are all factors. As seen in FIG. 7 there is a time delay after a pulse above threshold is transmitted as shown by line A before maximum light scattering is exhibited as shown by line B. In addition, following termination of the pulse the degree of exhibited light scattering tapers off gradually. Now in multicell displays the above-threshold voltages must be intermittent in order to permit individual segment control as previously described in conjunction with FIGS. 3 and 4. In order words, there must be a pulse duty cycle or equivalent. Typically, this duty cycle must be greater than the light scattering decay time due to the number of cells desired in a single display. Thus, before the next successive pulse for a particular cell or cell segment is applied the cell or segment will no longer be in its scattering mode. To operate under such conditions would result in a flickering light display. To avoid this problem the 2nd pulses are transmitted to each segment in the entire display at the conclusion of each digit energizing interval as shown in FIG. 4. The waveform of these pulses are such that they alone do not energize a cell or segment. However, their pulse amplitude and length is sufficient to substantially increase decay time of segments operating in their light scattering mode at the time the 2nd pulse is received. The result is shown by line C in FIG. 7. To clear the display the 2nd pulses may be temporarily suspended.

The 2nd pulses shown in FIG. 4 are seen to be of the same amplitude as that of the 1st pulses. They also are seen to terminate at the end of each digit energizing interval. To be effective, however, this need not be the case. In FIG. 5, for example, are shown alternative pulse trains in which the amplitude of the 2nd pulses is less than that of the 1st pulses. In addition, the pulses are seen to terminate prior to termination of the digit energizing intervals. Thus, these criteria are merely matters of choice which may best be determined empirically or by engineering limitations.

It should be understood that the just described embodiments are merely illustrative of principles of the invention, and that many modifications may be made thereto without departure from the spirit and scope thereof as set forth in the following claims.

I claim:

1. In a liquid crystal display having a plurality of liquid crystal display cells with each cell having a plurality of energizable character segments, the method of selective'y energizing said segments in forming visible character displays comprising the steps of:

sequentially pulsing said cells with 1st pulses of 1st pulse amplitude sufficient to energize said cells but of 1st pulse length insufficient to energize said cells;

between each of said sequential 1st pulses pulsing each of said cells with a 2nd pulse of 2nd pulse waveform insufficient to energize said cells alone and insufficient to energize said cells in successive waveform combination with said 1st pulse; and upon command, pulsing selective segments in time succession with selected 1st pulses applied to selected cells with 3rd pulses of 3rd pulse amplitude sufficient to energize said selected cell segments and of 3rd pulse length insufficient alone to energize said selected cell segments and insufficient to energize said selected cell segments in successive pulse length combination with said 2nd pulses but sufficient to energize said selected cell segments to a light scattering mode when said 3rd pulses are applied in successive pulse length combination with said selected 1st pulse; application of said 2nd pulses being effective thereafter to maintain said selected cell segments in said light scattering mode.

2. The method of claim 1 wherein said 2nd pulses are simultaneously applied to each of said cells.

3. The method of claim 1 wherein said 1st pulses are sequentially applied to said cells immediately upon termination of said 2nd pulses.

4. The method of claim 1 wherein said 1st and 2nd pulses are time spaced.

5. The method of claim 1 wherein said 3rd pulses are applied to said selected segments immediately upon termination of said 1st pulses applied to said selected cells.

6. The method of claim 1 wherein said 3rd pulses are terminated upon application of said 2nd pulses.

7. The method of claim 1 wherein said 1st pulse amplitude substantially equals said 2nd pulse amplitude.

8. The method of claim 1 wherein said 1st pulse amplitude is greater than the amplitude of said 2nd pulses.

9. The method of claim 1 wherein said 1st pulse amplitude is of the opposite polarity of said 3rd pulse amplitude.

10. The method of claim 1 wherein said 1st pulse amplitude substantially equals said 3rd pulse amplitude.

11. The method of claim 1 wherein the amplitude of said 2nd pulses substantially equals said 3rd pulse amplitude.

12. The method of claim 1 wherein the amplitude of said 2nd pulses is less than said 3rd pulse amplitude.

* * * * *

UNITED STATES PATENT OFFICE
CERTIFICATE OF CORRECTION

Patent No. 3,750,139                      Dated July 31, 1973

Inventor(s) THEODORE L. BLISHAK

It is certified that error appears in the above-identified patent and that said Letters Patent are hereby corrected as shown below:

Column 1, line 20, change "phenomonon" to -- phenomenon --

Column 3, line 51, after "Nesa", insert -- (TM) --

Column 5, line 32, after "pulsed", insert -- with the "1st pulses" --

Column 6, line 15, change "order" to -- other --

Signed and sealed this 12th day of February 1974.

(SEAL)
Attest:

EDWARD M. FLETCHER, JR.
Attesting Officer

C. MARSHALL DANN
Commissioner of Patents